Feb. 10, 1942.     J. W. ROSS     2,272,586
APPARATUS FOR DECORATING GLASS ARTICLES
Filed Feb. 18, 1939     2 Sheets-Sheet 1
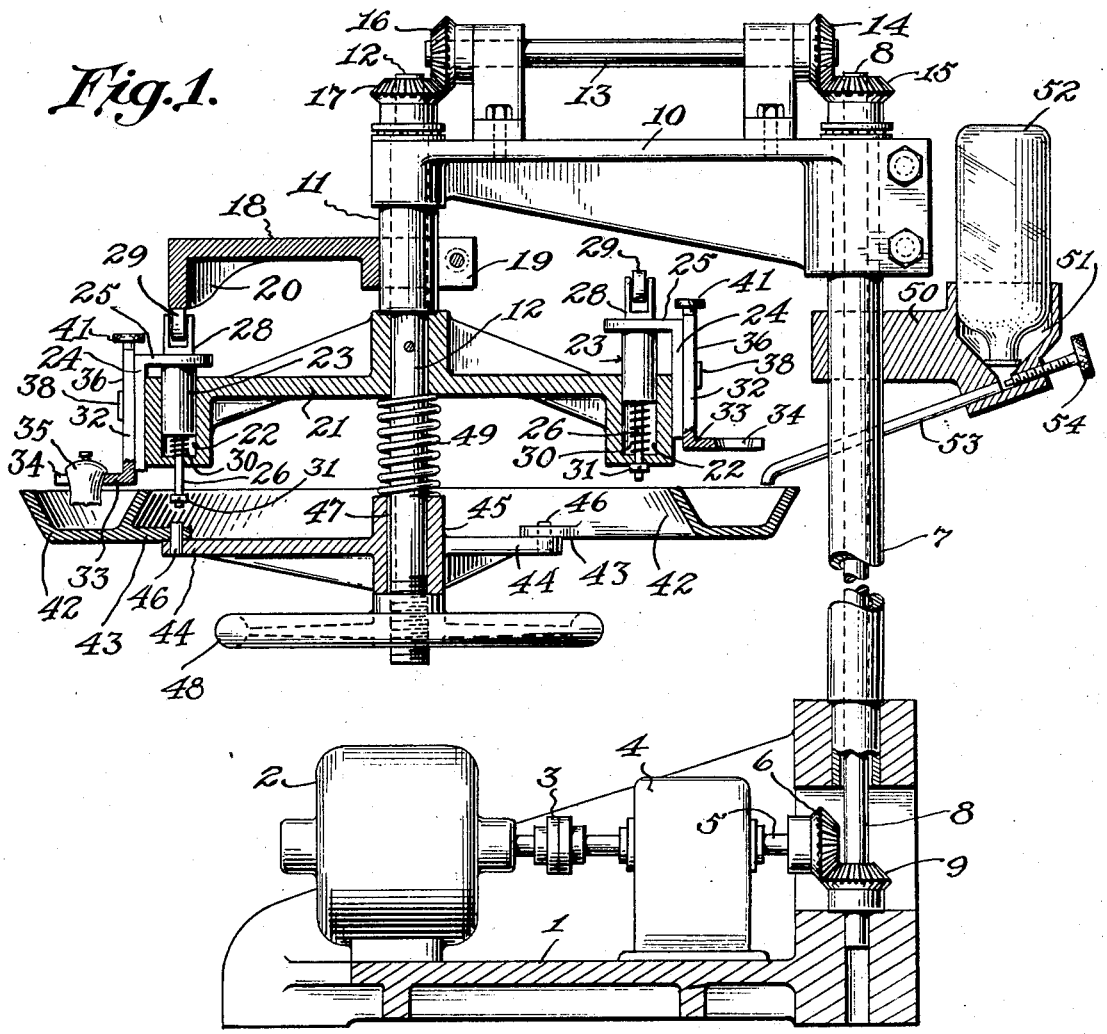
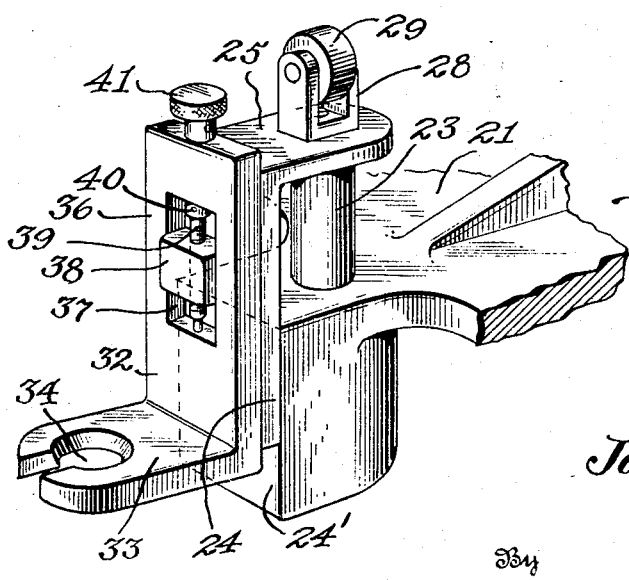
Inventor
James W. Ross
By Eccleston & Eccleston
Attorneys Feb. 10, 1942.  J. W. ROSS  2,272,586
APPARATUS FOR DECORATING GLASS ARTICLES
Filed Feb. 18, 1939  2 Sheets-Sheet 2
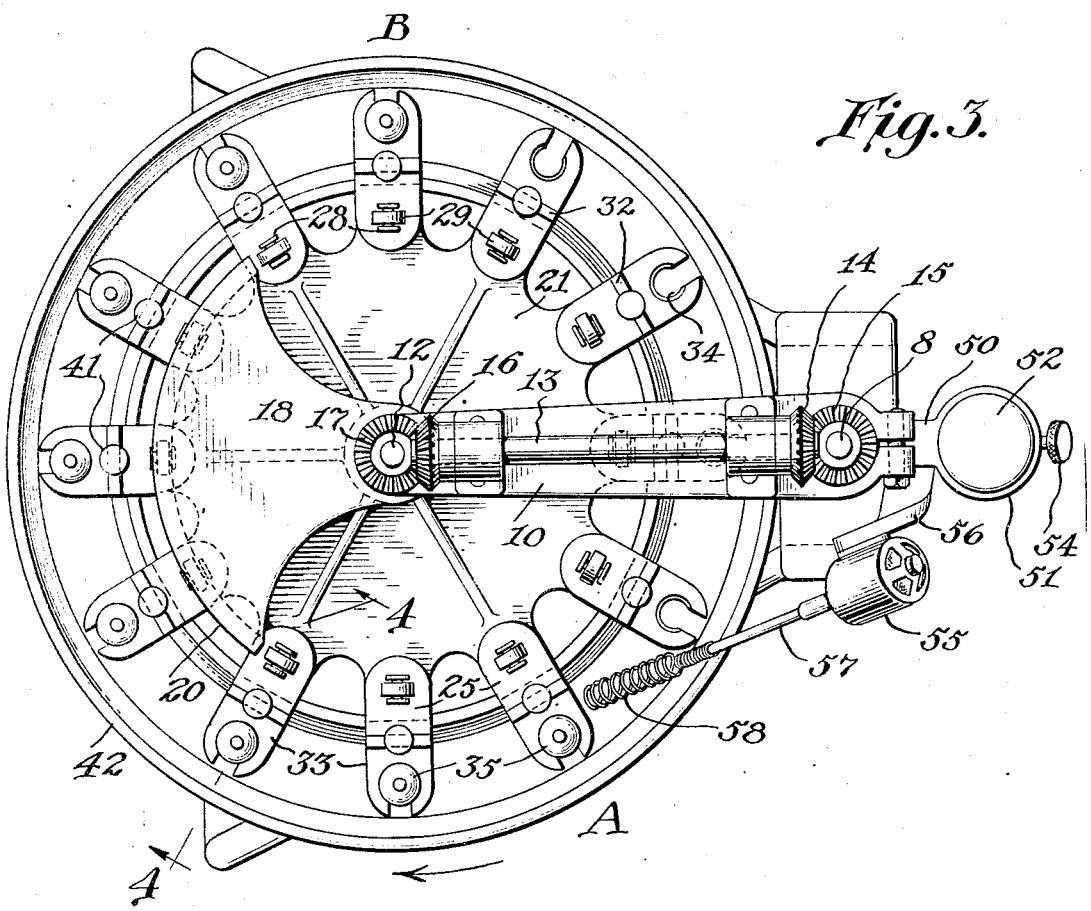
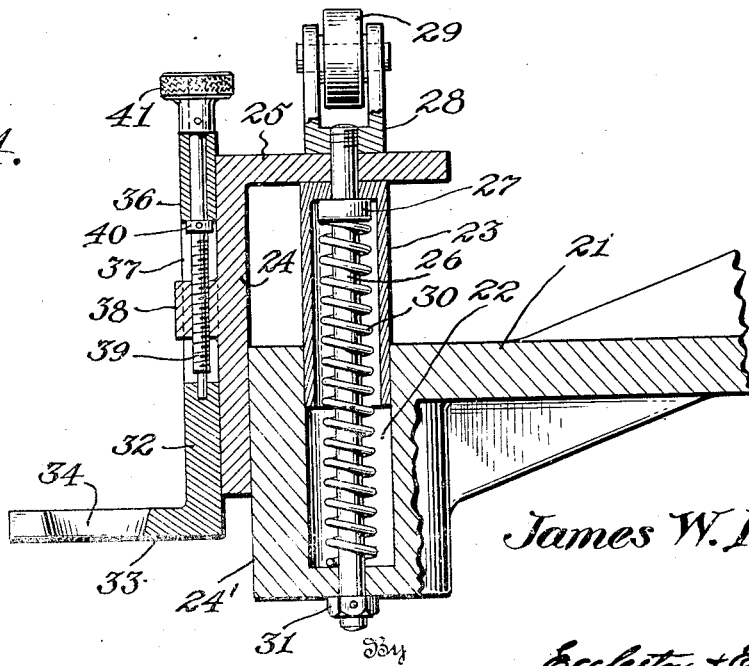
Inventor
James W. Ross
By Eccleston + Eccleston
Attorneys Patented Feb. 10, 1942

2,272,586

UNITED STATES PATENT OFFICE 2,272,586

APPARATUS FOR DECORATING GLASS ARTICLES

James W. Ross, Washington, Pa., assignor to Hazel-Atlas Glass Company, Wheeling, W. Va., a corporation of West Virginia Application February 18, 1939, Serial No. 257,211

11 Claims. (Cl. 91—46)

The invention relates to an apparatus for decorating glass articles and particularly for painting the articles by dipping them in a reservoir of paint.

One of the objects of the invention is to provide an apparatus by which the entire article or the desired portion thereof may be painted.

Another object of the invention is to provide an apparatus which operates continuously and decorates the articles at high speed.

A further object of the invention is to provide an apparatus in which the articles to be decorated and the paint reservoir are continuously travelling at the same speed in the same direction, in a horizontal plane, whereby the articles can be dipped in the paint at any time, and without there being any relative lateral movement between the paint and the article being painted.

Various other objects and advantages of the invention will be apparent to those skilled in the art, from the following detailed description, when taken in connection with the accompanying drawings, in which Figure 1 is a vertical sectional view of the apparatus; parts being shown in elevation.

Figure 2 is a perspective view of one of the dipping units.

Figure 3 is a plan view of the apparatus; and

Figure 4 is a vertical sectional view of one of the dipping units, taken on line 4—4 of Figure 3.

Referring to the drawings in more detail, numeral 1 indicates a base upon which is mounted a motor 2. This motor, through coupling 3 and gear reduction unit 4, drives a shaft 5 carrying a miter gear 6.

Numeral 7 refers to a vertical hollow column fixed to the base 1. Extending through this column is a shaft 8, and fixed to the lower end of the shaft is a miter gear 9 meshing with the miter gear 6.

A horizontal bracket 10 is mounted on the column 7, adjacent the upper end thereof, and the outer end of the bracket is provided with a bearing member 11 for a vertical shaft 12. Mounted in suitable bearings on the bracket is a horizontal shaft 13, having a miter gear 14 at one end meshing with the miter gear 15 on the shaft 8, and a miter gear 16 on the other end meshing with a miter gear 17 on the upper end of the vertical shaft 12. Thus the shaft 12 is continuously rotated by the motor 2.

Numeral 18 refers to a plate which is adjustably attached to the bearing member 11 by any desired means, as by the split hub 19. The periphery of the plate carries a depending cam 20, which controls the up and down movements of the elevators or dipping units, as will presently appear. Of course the cam plate is stationary, but it can be vertically adjusted on the bearing member, and it can be circumferentially adjusted about the bearing member, by reason of the split hub 19 or other suitable adjusting means.

Numeral 21 refers to a spider which is pinned or otherwise secured to the shaft 12 to continuously rotate therewith. This spider carries any desired number of elevators or dipping units, twelve of the units being shown in the present illustration. All of the units are identical in construction, and the description of one of them will therefore be sufficient.

Each arm of the spider is provided with a cylinder 22, as best shown in Figures 1 and 4, and a sleeve type piston 23 is fitted for vertical sliding movement in each of the cylinders. Numeral 24 refers to a vertical slide plate in sliding contact with a flat face 24' of the spider arm. This plate has an arm 25 which is attached to the top of the piston by any desired means. In the present embodiment a piston rod 26 has a collar 27 abutting against the underside of the top of the piston, and the rod extends upwardly through the piston and through the arm 25, and tapped on its upper end is a clevis 28, carrying a roller 29. The rollers of the several units successively cooperate with the cam 20 for moving the dipping units downwardly. The units are preferably elevated by springs. For this purpose a coil spring 30 is mounted on the piston rod 26; the upper end of the spring bearing against the collar 27, and the lower end of the spring bearing against the bottom of the cylinder 22. The lower end of the piston rod projects through an opening in the bottom of the cylinder, and the parts are confined by a nut 31 on the end of the rod.

Any desired means may be employed for supporting the ware while it is being decorated. In the present embodiment a bracket 32 is mounted on the sliding plate 24. The horizontal arm 33 of the bracket is provided with a suitable opening 34 to receive the ware to be decorated. Numeral 35 refers to the ware.

The ware supporting means is preferably adjustable vertically. For this purpose the vertical arm 36 of the bracket 32 is slotted at 37 to receive a stud 38 formed on plate 24. A rod 39 extends downwardly through the arm 36 and the stud 38, and is in threaded engagement with the latter. The rod is held against vertical movement relative to the arm 36 by reason of a collar 40 bearing against the upper wall of the slot 37, and a knob 41 bearing against the top of the arm. Thus by turning the knob in the proper direction each dipping unit can be individually adjusted up or down as desired.

An annular trough for carrying the ceramic paint or other decorating material is referred to by numeral 42. This trough is provided with inwardly extending arms 43 which rest on the arms 44 of a spider 45. The trough is held in position by pins 46. Thus the trough may be easily removed for cleaning or for the substitution of another trough for another color of paint.

The spider 45 is connected to the shaft 12, and is caused to rotate therewith, and hence with the dipping units, by means of a key 47. Of course the key permits the spider to be moved up or down. The spider rests on the hub of a hand wheel 48, which is threaded on the lower end of the shaft 12. A coil spring 49 mounted on the shaft 12, between the spider 21 and the spider 45, holds the latter down against the hub of the hand wheel. By rotating the hand wheel in the proper direction the trough will be raised or lowered to the desired extent, thereby varying the extent to which all of the articles will be immersed in the paint.

Numeral 50 refers to a bracket which is mounted on the column 7. This bracket is cup shaped at its outer end, as indicated by numeral 51, to receive an inverted paint container 52. The paint flows from the cup to the trough 42 through a tube 53, and the flow is controlled by a needle valve 54.

A motor 55 is attached to an arm 56 extending from the bracket 50. The shaft 57 of the motor carries a coil spring agitator 58 located in the trough 42, and which serves to stir the paint and maintain it at a uniform consistency.

In operation, the trough is filled to the desired level with ceramic paint or other decorating material. The motors 2 and 55 are started to cause the continuous rotation of the machine and the agitator. Preferably, before decorating any ware, the machine and agitator are run for a brief period to whip or stir the liquid color into a uniform consistency.

The paint having been properly conditioned, the running of the machine and agitator is continued, and the articles to be decorated are fed to the machine. The articles may be placed on the dipping units at any desired point, as at A, Figure 3. As the dipping units continuously pass this point the operator places an article in the opening 34 of each bracket 32. It will be understood, of course, that any desired means may be employed for holding the articles to be decorated.

The dipping units, each carrying an article, continue their forward travel, in the direction of the arrow (Fig. 3), and of course the articles are above the paint level. In the continuous forward travel each unit successively comes under the cam 20. The rollers 29 ride down the cam track thereby successively moving the dipping units downwardly, against the pressure of coil springs 30. This downward movement immerses the articles to the desired depth in the paint. As the units continue their forward travel the rollers ride up the cam track, under the influence of the springs 30, and thereby lift the articles from the paint in the trough. The decorated articles can now be removed from the machine at any desired point, as at B (Fig. 3). Or, if preferred, the articles may continue around to a point adjacent A, where the same operator who is feeding the machine with articles to be decorated may remove those which have been decorated.

It will be noted that the dipping units and the paint trough are always travelling at the same speed in the same direction, in a horizontal plane, and that there is no relative lateral movement between the paint and the articles being painted. Also, while the paint is being continuously stirred by the agitator, so that it will have a uniform consistency, yet no current of paint in the trough is created, which current would tend to cause an uneven or non-uniform distribution of the paint on the articles.

In view of the fact that the paint trough and dipping units are always travelling together, the articles can be dipped at any desired point in their continuous travel. For this purpose, the cam is preferably adjustable circumferentially, as illustrated. In some installations it may be desirable to employ more than one cam, so that as the articles are dipped and elevated by one cam, the dipping units may be recharged immediately with other articles to be dipped when they reach the next cam.

In the decoration of different articles, a different depth of immersion may be desired. In accordance with the present invention, this is quickly and easily acomplished by merely turning the hand wheel 48, to raise or lower the paint trough to the desired extent. Also, the extent of immersion can be varied by vertically adjusting the cam on the bearing member 11. To take care of any inaccuracies in the dipping units, or for other purposes, each unit may be adjusted individually by turning the knob 41 to raise or lower the ware-carrying bracket with respect to the vertical slide plate 24.

Paint is continuously delivered to the trough through the tube 53, and the volume flow is regulated by the valve 54, so that the paint level in the trough will remain constant.

The apparatus is very simple in construction and operation, and efficiently decorates articles in the manner described, at very high speed. While I have illustrated and described in detail the preferred embodiment of the apparatus, yet it will be understood that many changes and modifications may be made without departing from the spirit of the invention, and all such changes and modifications are intended to be included within the scope of the appended claims.

What I claim is:

1. An apparatus for decorating glass articles, including a horizontal trough adapted to carry ceramic paint, means for rotating the trough, dipping units arranged over the trough, means for causing the dipping units to travel with the trough, said dipping units adapted to carry articles to be decorated, means for successively moving the dipping units downwardly to dip the articles in the paint, and an agitating element immersed in the paint in the trough, said agitating element being mounted on a stationary base, whereby the trough is movable relative to the agitating element.

2. An apparatus for decorating glass articles, including a horizontal annular trough adapted to carry ceramic paint, means for continuously rotating the trough, dipping units arranged over the trough, means for causing the dipping units to travel with the trough, said dipping units adapted to carry articles to be decorated, means for successively moving the dipping units downwardly to dip the articles in the paint, a stirring coil immersed in the paint in the trough, and means for continuously rotating the coil about its own axis.

3. An apparatus for decorating glass articles, including a horizontal trough adapted to carry ceramic paint, means for continuously rotating the trough, dipping units arranged over the trough and adapted to carry articles to be decorated, means for causing said dipping units to continuously travel at the same speed and in the same direction as the paint trough, means for successively moving the dipping units downwardly to dip the articles in the paint, and means for stirring the paint, said paint stirring means operating in the paint while the paint is being continuously carried in a direction away from the stirring means by the rotation of the trough.

4. An apparatus for decorating glass articles including a horizontal annular trough adapted to carry color material, the level of the color material in the trough remaining substantially constant, means for rotating the trough, dipping units arranged over the trough, means for causing the dipping units to travel with the trough, said dipping units adapted to carry articles to be decorated, means for lowering the dipping units to cause the articles carried thereby to dip into the color material in the trough, the color material remaining quiescent during the dipping operation, and means for lifting the dipping units.

5. An apparatus for decorating glass articles, including a horizontal annular trough adapted to carry color material, the level of the color material in the trough remaining substantially constant, means for rotating the trough, said trough being unobstructed, dipping units arranged over the trough, means for causing the dipping units to travel with the trough, said dipping units adapted to carry articles to be decorated, means for lowering the dipping units to cause the articles carried thereby to dip into the color material in the trough, the color material remaining quiescent during the dipping operation, and means for lifting the dipping units.

6. An apparatus for decorating glass articles, including a horizontal annular trough adapted to carry color material, the lever of the color material in the trough remaining substantially constant, means for rotating the trough, dipping units arranged over the trough, means for causing the dipping units to travel with the trough, said dipping units adapted to carry articles to be decorated, means for successively lowering the dipping units to cause the articles carried thereby to dip into the color material in the trough, the color material remaining quiescent during the dipping operation, and means for lifting the dipping units.

7. An apparatus for decorating glass articles, including a horizontal annular trough adapted to carry color material, the level of the color material in the trough remaining substantially constant, means for rotating the trough, dipping units arranged over the trough, means for causing the dipping units to travel with the trough, said dipping units adapted to carry articles to be decorated, means for lowering the dipping units to cause the articles carried thereby to dip into the color material in the trough, the color material remaining quiescent during the dipping operation, means for simultaneously adjusting the depth to which all of the articles are dipped in the color material, and means for lifting the dipping units.

8. An apparatus for decorating glass articles, including a horizontal annular trough adapted to carry color material, the level of the color material in the trough remaining substantially constant, means for rotating the trough, dipping units arranged over the trough, means for causing the dipping units to travel with the trough, said dipping units adapted to carry articles to be decorated, means for lowering the dipping units to cause the articles carried thereby to dip into the color material in the trough, the color material remaining quiescent during the dipping operation, means for individually adjusting the lower limit of movement of each dipping unit, and means for lifting the dipping units.

9. An apparatus for decorating glass articles including a horizontal annular trough adapted to carry color material, the level of the color material in the trough remaining substantially constant, means for rotating the trough, dipping units arranged over the trough, means for causing the dipping units to travel with the trough, said dipping units adapted to carry articles to be decorated, means for lowering the dipping units to cause the articles carried thereby to dip into the color material in the trough, the color material remaining quiescent during the dipping operation, means for simultaneously adjusting the depth to which all of the articles are dipped in the color material, means for individually adjusting the lower limit of movement of each dipping unit, and means for lifting the dipping units.

10. An apparatus for decorating glass articles, including a horizontal annular trough adapted to carry color material, the level of the color material in the trough remaining substantially constant, means for rotating the trough, dipping units arranged over the trough, means for causing the dipping units to travel with the trough, said dipping units adapted to carry articles to be decorated, means for lowering the dipping units to cause the articles carried thereby to dip into the color material in the trough, the color material remaining quiescent during the dipping operation, means for vertically adjusting the trough to vary the extent to which the articles are dipped, and means for lifting the dipping units.

11. An apparatus for decorating glass articles, including a vertical shaft, means for continuously rotating the shaft, a spider mounted on the shaft and rotatable therein, a plurality of dipping units carried by the spider, said dipping units adapted to carry articles to be decorated, a second spider mounted on the shaft below the first mentioned spider and rotatable with the shaft, a trough carried by the second spider, said trough adapted to carry color material, the level of the color material in the trough remaining substantially constant, means for lowering the dipping units to cause the articles carried thereby to dip into the color material in the trough, the color material remaining quiescent during the dipping operation, means for varying the vertical distance between two spiders to adjust the extent to which the articles are dipped in the color material, and means for lifting the dipping units.

JAMES W. ROSS.